United States Patent
Arthur

[15] 3,697,987
[45] Oct. 10, 1972

[54] COLLISION AVOIDANCE SYSTEM
[72] Inventor: Richard J. Arthur, Charlottesville, Va.
[73] Assignee: Sperry Rand Corporation
[22] Filed: Nov. 12, 1970
[21] Appl. No.: 88,783

[52] U.S. Cl..........343/5 EM, 343/11 R, 343/112 CA
[51] Int. Cl.................................................G01s 7/22
[58] Field of Search............343/11 R, 5 EM, 112 CA

[56] References Cited

UNITED STATES PATENTS

| | | |
|---|---|---|
| 2,653,312 | 9/1953 | Haworth.................343/5 EM |
| 3,396,390 | 8/1968 | Riggs et al.......343/112 CA X |
| 3,094,694 | 6/1963 | Beach.................343/5 EM X |
| 3,212,086 | 10/1965 | Robinson.................343/11 R |
| 3,388,395 | 6/1968 | Gumphrey et al.......343/11 R |

Primary Examiner—Malcolm F. Hubler
Attorney—S. C. Yeaton

[57] ABSTRACT

A collision warning and collision avoidance radar navigation system employs the tau collision warning criterion to derive an improved presentation on a radar plan position or other cathode ray indicator. An intruding target is labelled dangerous if the ratio of intruder closing range to his range rate is seen to be less than a predetermined value by the observation of the relative position of a synthesized bearing marker generated on the display for each target echo.

15 Claims, 12 Drawing Figures

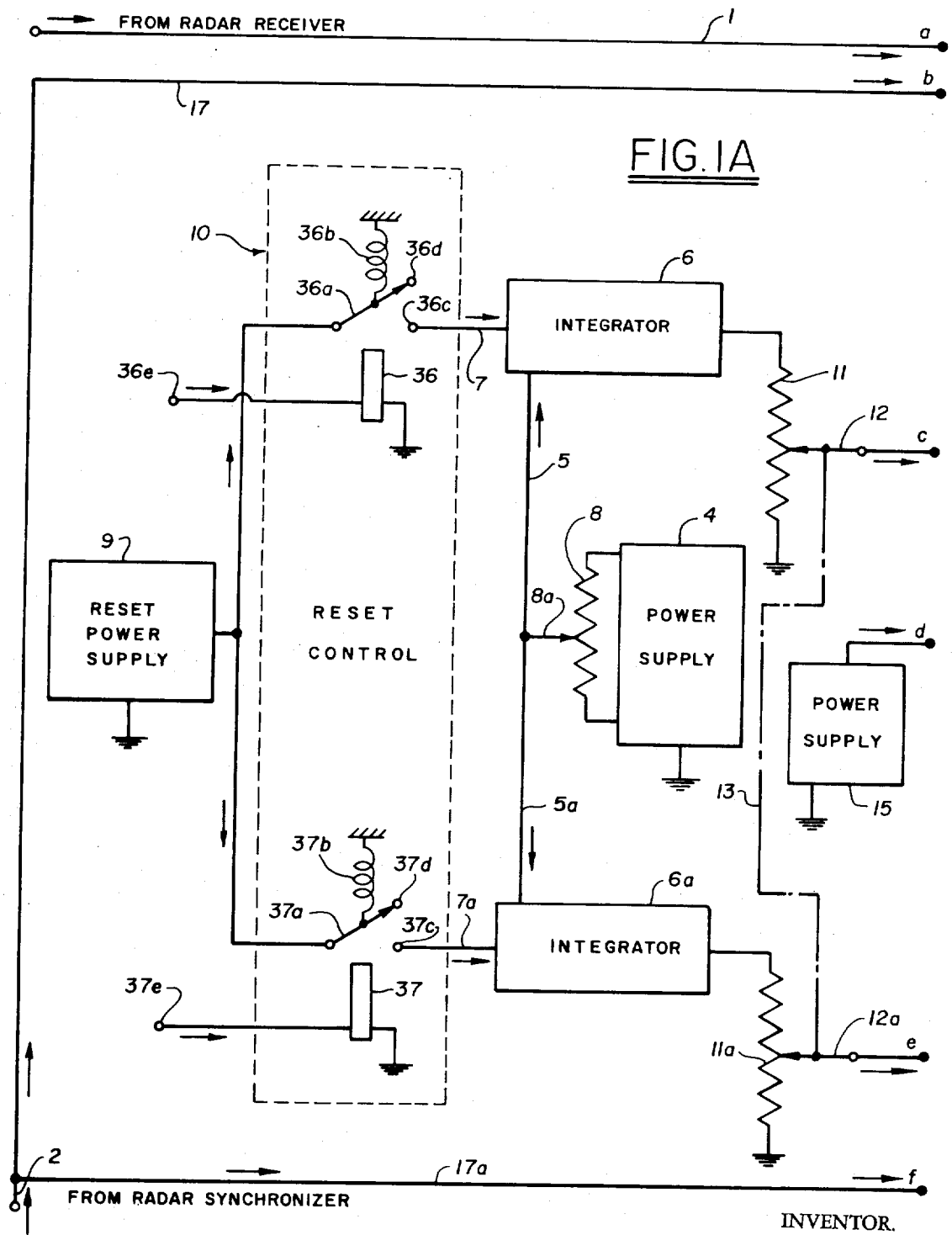

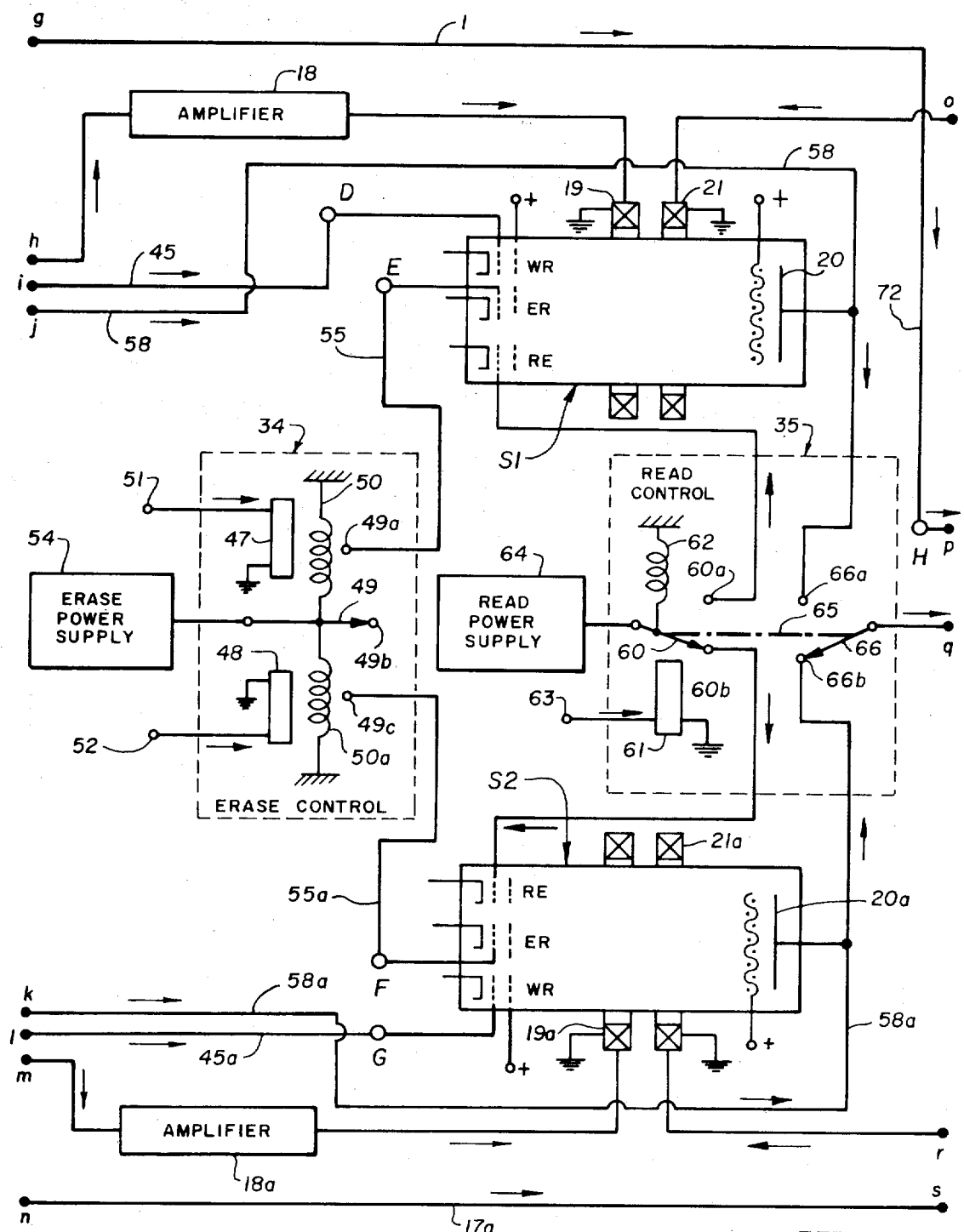
FIG. IC.

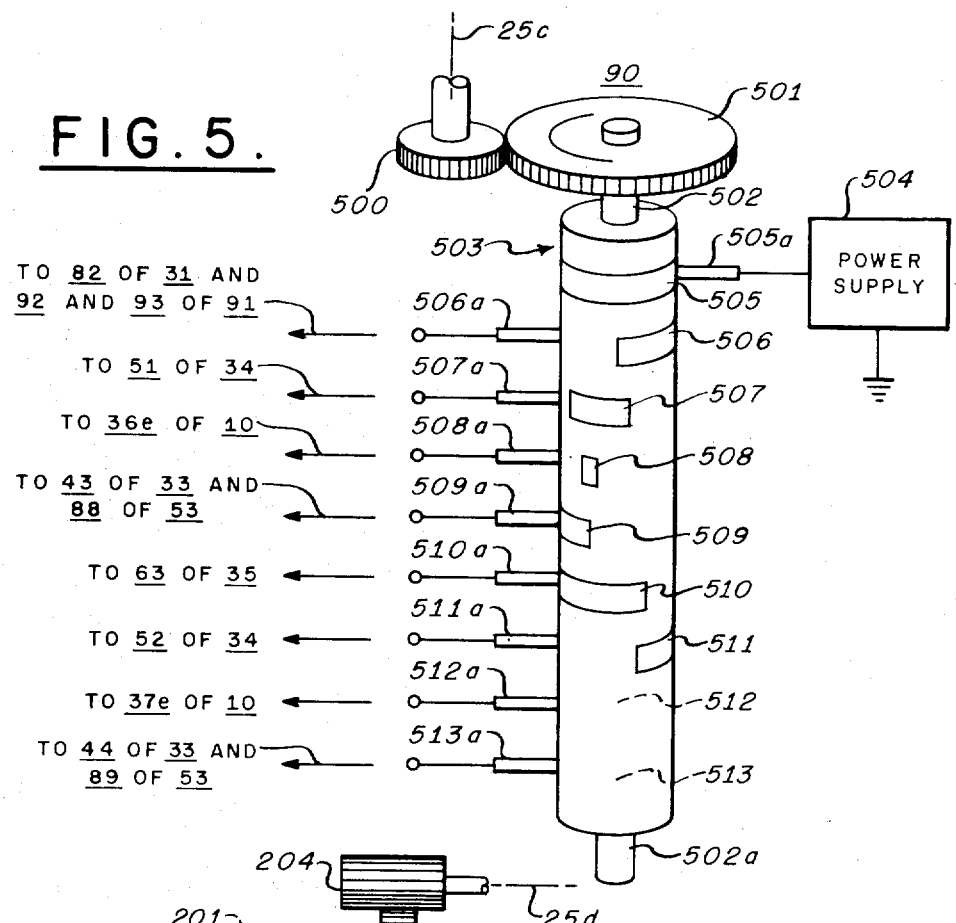
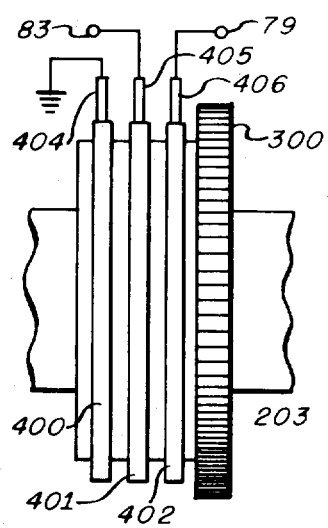
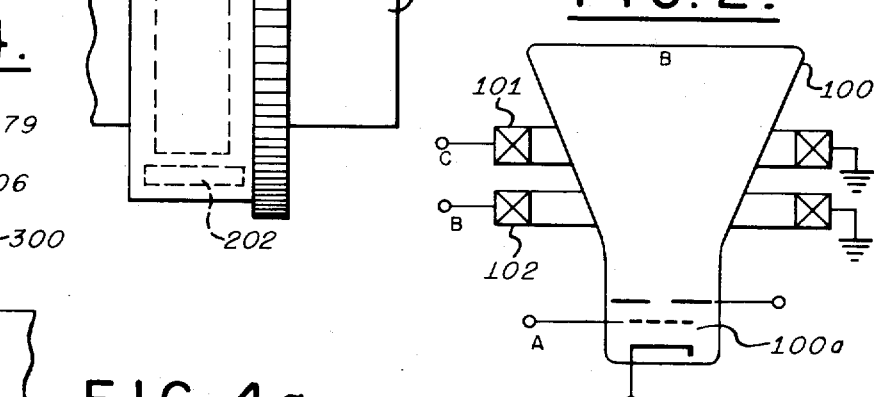

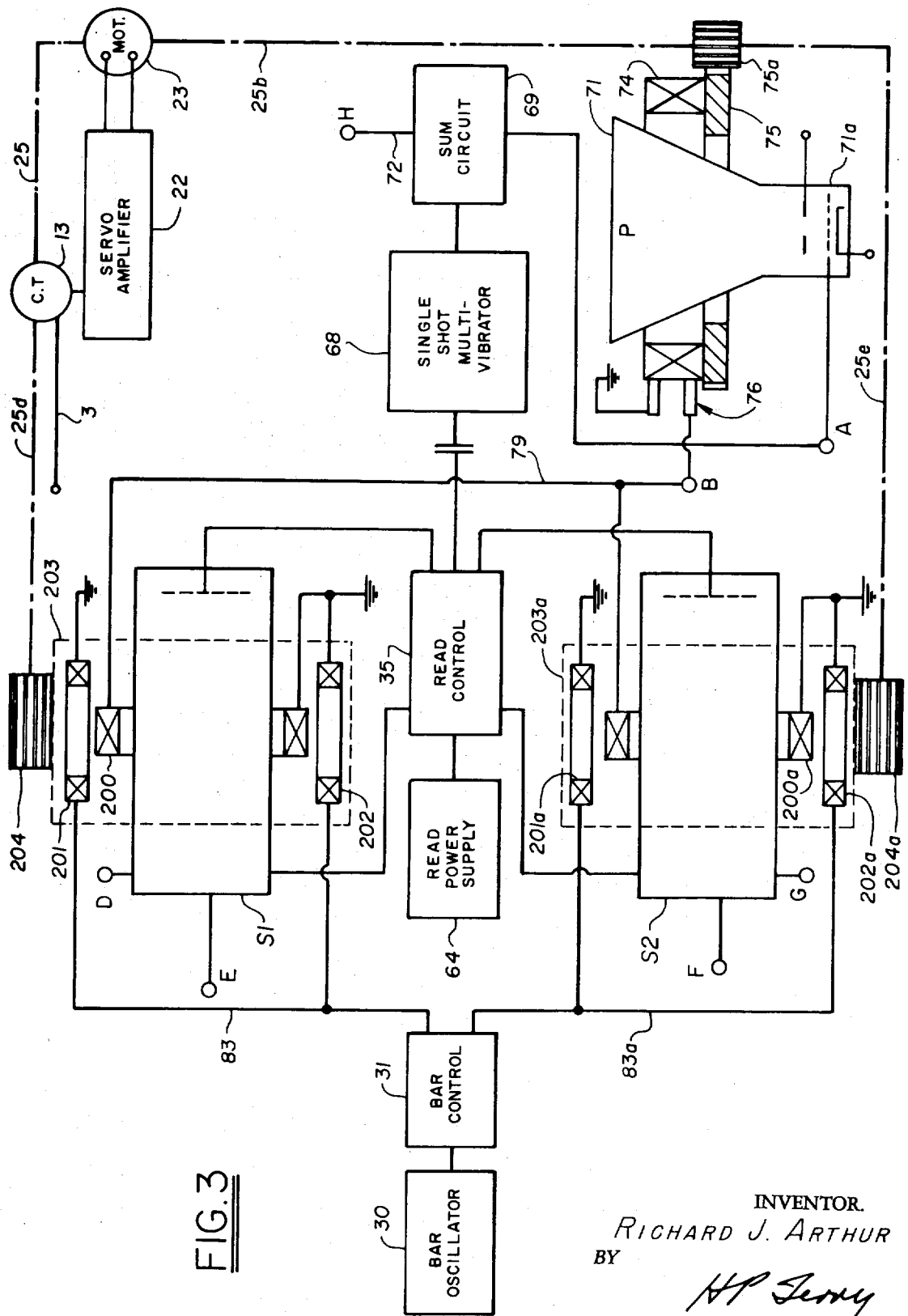

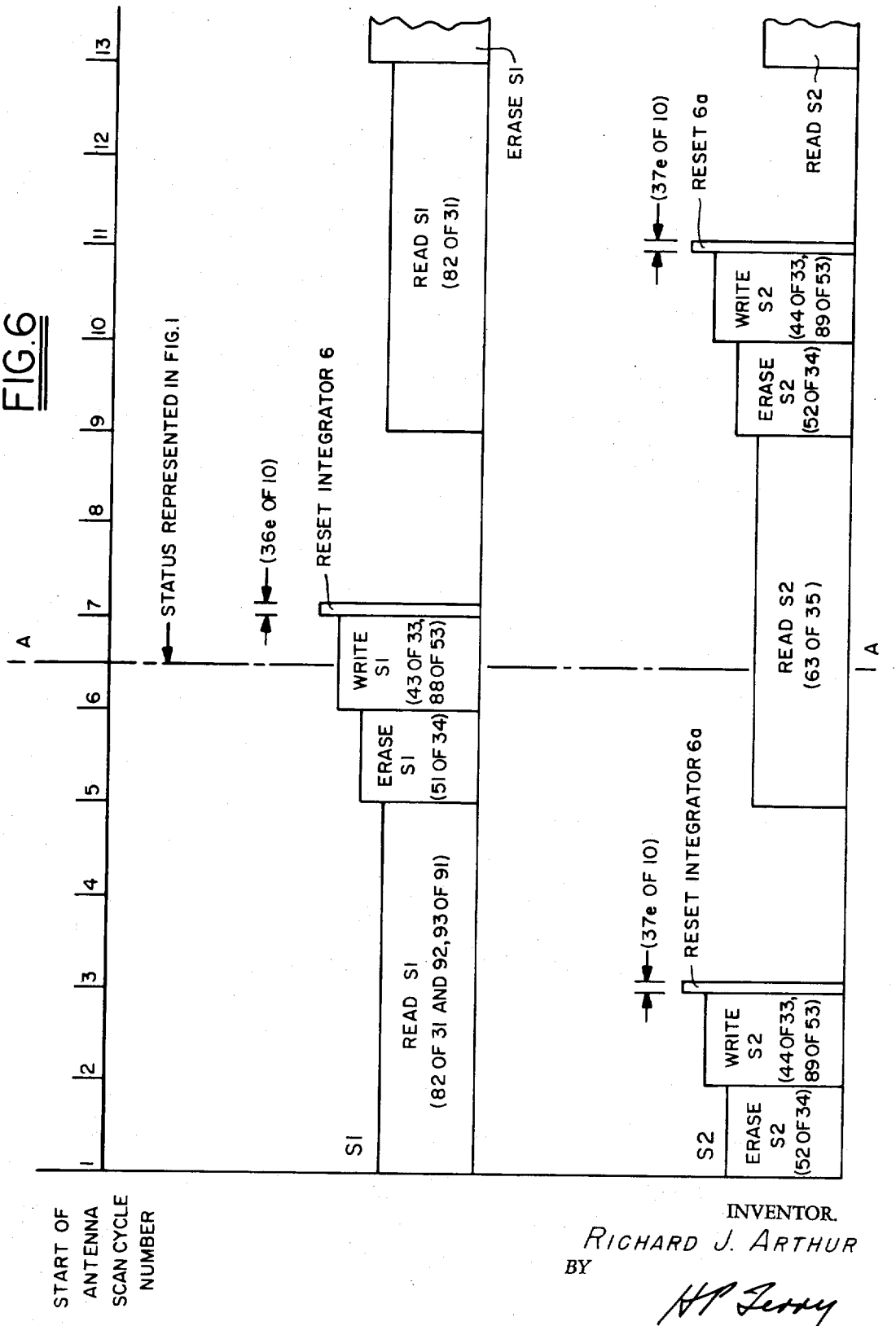

COLLISION AVOIDANCE SYSTEM

BACKGROUND OF THE INVENTION

1. Field of the Invention

The invention pertains to radio means for early warning of potential collisions between moving vehicles and more particularly relates to means adaptable for use in azimuth scanning radar systems for generating a cathode ray display providing a readily interpretable plan position or other presentation of factors indicating collision possibilities between marine vessels.

2. Description of the Prior Art

Various radio and other aids to marine navigation have been employed with some degree of success in the past for the purpose of warning ship operators of potential collisions between marine vessels and for preventing such collisions.

Of these, detection systems assessing bearing rate and range rate data derived by radar or other sensors have not been distinctively successful. The detection of small bearing rates at large ranges does not lend itself to accurate instrumentation, since small errors between successive bearing readings destroy the accuracy of prediction of the closest point of approach of an intruding vessel.

A technique often employed uses the passing distance at closest point of approach and may involve use of radar indicator reflection plotters, plotting tables, or photographic plotting systems. Of these systems, the expensive photographic plotting systems are possibly the most accurate, as few errors can be introduced by the operator. Reflection plotters are also of value, since transfer of data, though manual, is done in a way largely negating the possibility of serious errors. Errors in plotting boards or tables can be very large. Generally, a single operator cannot accurately plot and assess the degree of danger attached to as few as three potential targets simultaneously. Semi-automatic transfer of radar data to plotting boards has been attempted, but the instrumentation is expensive.

SUMMARY OF THE INVENTION

The invention is a collision probability assessment system employing a modified radar plan position display with an azimuth scanning radar system. It warns of intruding vessels and assesses the potential of collision by employment of the tau criterion, rather than the former closest point of approach criterion. Use of the tau criterion eliminates errors in the prior art systems associated with inaccurate bearing measurement. It is established that a closing-range intruder is dangerous by the visual observation of images appearing on a direct viewing cathode ray tube. As a consequence of successive radar observations of a potential intruder, two pictures are superimposed at any given time on the screen of the cathode ray tube. One picture is formed directly from raw radar data, and the other is generated using processed data which has been stored for a predetermined storage time. The stored data is read out of the storage device at a rate which varies as a function of time after the data was stored. The stored data, when thus read out, is displayed with a special demarcation as a superposed picture on the cathode ray tube screen. The demarked symbol is generated in association with each raw radar target image and provides a reference standard for each such raw radar target image. Relative range or azimuth motion between the raw radar target image and the synthesized reference standard or marker provides means for estimation of the threat potential of an intruding vessel. If the raw radar target image lags the marker, the vessel under study is not likely to represent a collision threat; if the raw radar image lies on the marker or moves ahead of it, the vessel under scrutiny is a real collision threat. Other relations between the images indicate other degrees of threat or of non-threat.

BRIEF DESCRIPTION OF THE DRAWINGS

FIGS. 1A, 1B, 1C, and 1D present an electrical diagram of a preferred form of the invention, showing electrical interconnections.

FIG. 2 illustrates an alternative indicator for use in the apparatus of FIG. 1D.

FIG. 3 illustrates an alternative arrangement of a portion of the circuit of FIGS. 1C and 1D.

FIGS. 4 and 4A show mechanical details of a storage device used in FIG. 3.

FIG. 5 shows details of a mechanical element of the apparatus of FIG. 1D.

FIG. 6 is a graphical presentation useful in explaining the timing of operation of elements found in FIGS. 1A, 1B, 1C, 1D, and 5.

DESCRIPTION OF THE PREFERRED EMBODIMENT

Figure 1B:
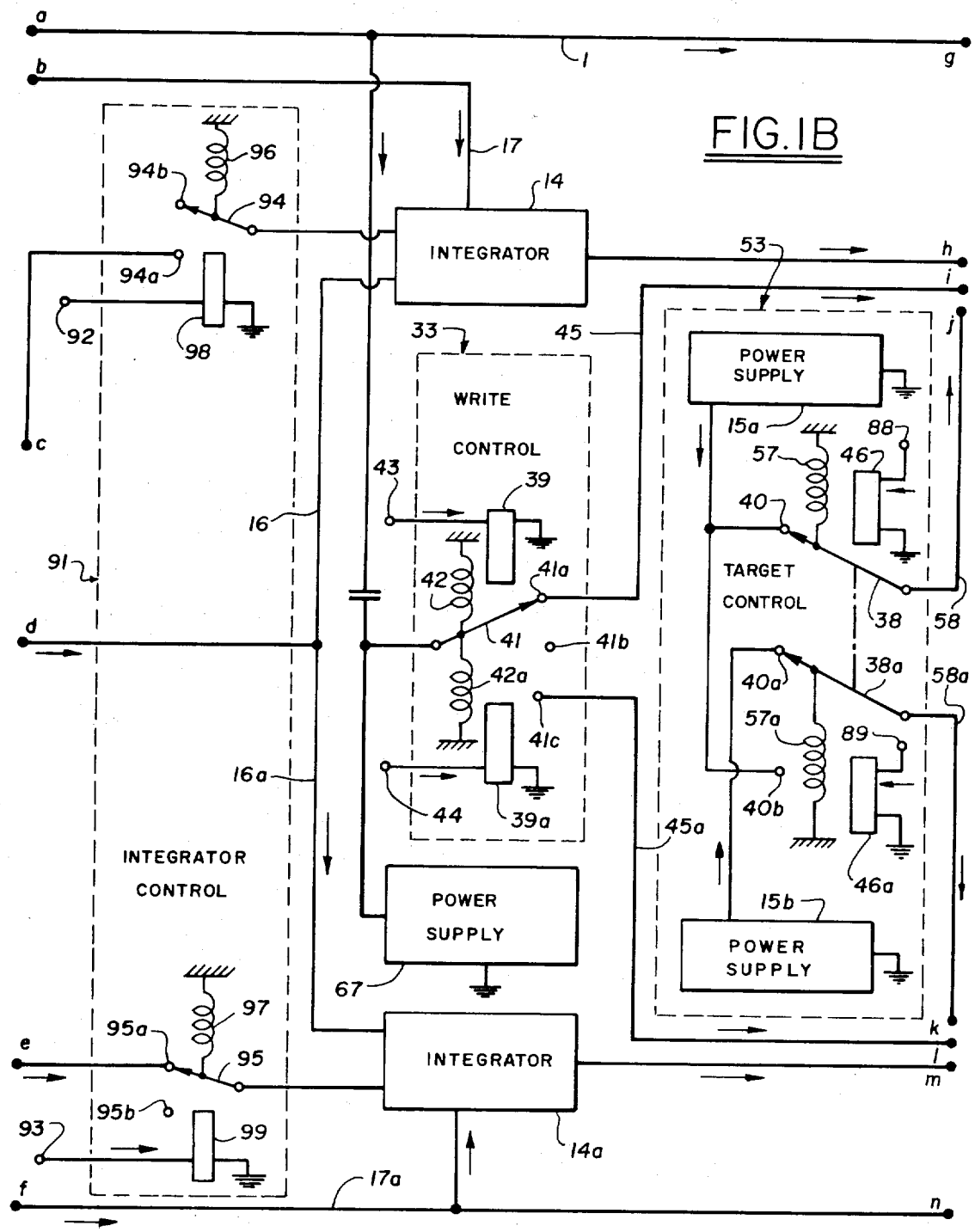
Figure 1D:
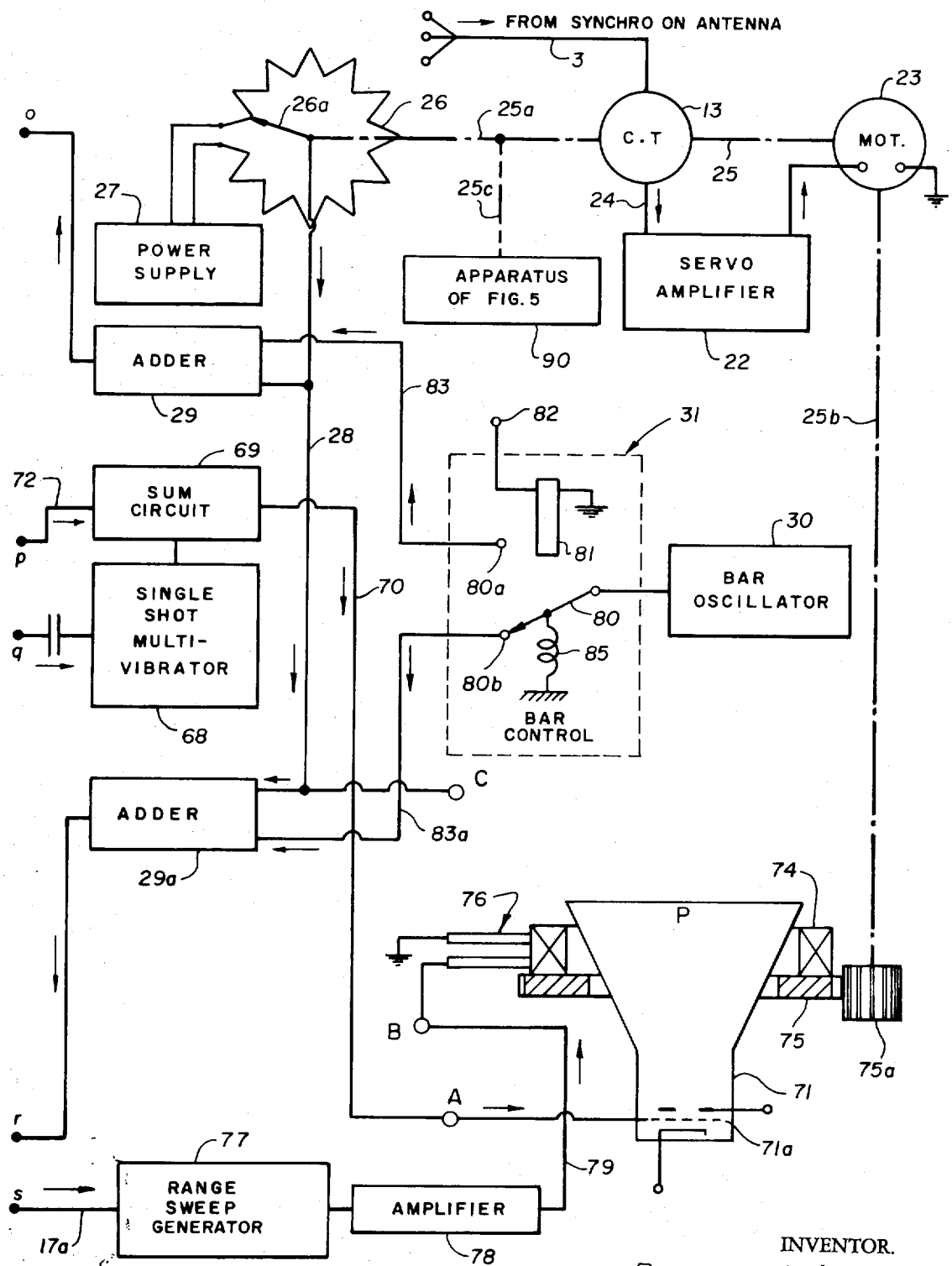

In the system of FIGS. 1A, 1B, 1C, and 1D, certain conventional signals are derived from an azimuth scanning radar system of the type often employed for marine navigation purposes and providing type P or plan position indication of obstacles. Such signals are indicated as being supplied to leads 1, 2, and 3. Lead 1, seen in FIG. 1A, conveys conventional radar echo signals from the pulse radar receiver (not shown) into the novel signal processing apparatus. Lead 2, seen also in FIG. 1A, supplies synchronizer or timing pulses from the conventional radar synchronizer (not shown), while lead 3, which is seen in FIG. 1D and will normally be a multi-conductor device, is coupled to the multi-wire output of a conventional synchro repeater (not shown) normally used as a source of antenna azimuth bearing data in marine and other azimuth scanning radar systems. While it is the usual practice to rotate such scanning antennas continuously for 360 angular degree azimuth viewing, it is possible also to operate the novel data processing system with lesser angular antenna coverage, as in systems generating offset type P displays.

It will be seen in FIGS. 1A to 1D that the signal processor comprises certain control elements and also includes a pair of storage or signal processing channels which process the radar data. A first storage channel involving storage tube S1 begins where lead 5 branches in FIG. 1A from tap 8a of a resistor 8 placed across power supply 4. It is also seen that a second storage channel involving storage tube S2 begins where lead 5a branches in FIG. 1A from tap 8a associated with power supply 4.

Referring now particularly to the first signal processing or storage channel, lead 5 is coupled to a conventional integrator circuit 6 for generating a positively increasing ramp signal when triggered or re-set by an impulse appearing on reset lead 7. The appearance of such a reset signal on lead 7 is determined by reset power supply 9 and more particularly by the condition of reset control 10, as will be explained. The output of integrator 6 is fed to an end of potentiometer 11, the opposite end of which is grounded. It is observed that tap 12 of potentiometer 11 is arranged to be moved in synchronism with tap 12a of a corresponding potentiometer 11a, found in the second signal processing channel, by virtue of mechanical linkage 13.

Referring again to the first signal processing channel, tap 12 supplies its integrated output, when permitted to do so by integrator control 91 of FIG. 1B, to a second integrator 14. The natures of integrator control 91 and of the integrator 14 which it feeds remain to be discussed. Integrator 14 has two additional inputs, the first of these being supplied via branching lead 16 from power supply 15. The second input to integrator 14 is a reset pulse applied by branching lead 17 and lead 2 from the radar system synchronizer. The integrated output of circuit 6 is further modified by integrator 14, is amplified, if required, in amplifier 18 of FIG. 1C and is supplied to deflection means 19 of cathode ray storage tube S1. In the instance illustrated in FIG. 1C, deflection device 19 is a conventional stationary magnetic deflection coil, though other electron beam deflection means may be employed. Deflection coil 19 ensures a relatively rapid or range scansion of an electron beam, when intensified, across a storage face associated with a target 20 found at one end of storage tube S1 in FIG. 1C. To provide a relatively slow or antenna bearing scansions across the face of target 20 at right angles to the scanning produced by deflection coil 19, deflection coil 21 is provided, as will be further explained. Accordingly, the electron beam when intensified, performs a raster or type B scan across the storage face of target 20.

The second above-referred-to signal processing or storage channel begins in FIG. 1A with lead 5a branching from resistor 8 and tap 8a, lead 5a being coupled to an integrator 6a similar to integrator 6 of the first channel. Integrator 6a forms a positively increasing ramp signal when triggered or re-set by a pulse appearing on reset lead 7a because of the action of reset control 10. The output of integrator 6a is fed to one end of potentiometer 11a, the opposite end of which is grounded.

The adjustable tap 12a supplies its integrated input via integrator control 91 of FIG. 1B to a second integrator 14a similar to integrator 14 and whose nature remains to be discussed in more detail. Integrator 14a, like integrator 14 of the first processing channel, has two further inputs, the first of these being continuously supplied via branching lead 16a from power supply 15. The second input to integrator 14a is a reset pulse supplied via branching lead 17a and lead 2 from the radar system synchronizer. The integrated signal received through control 91 from circuit 6a is further modified by integrator 14a and is amplified, being supplied through amplifier 18a of FIG. 1C to deflection coil 19a of a second cathode ray storage tube S2. Deflection coil 19a operates similarly to deflection coil 19 of storage tube S1 in that it supplies relatively rapid range scanning of an electron beam, when present, across a storage face associated with target 20a found at one end of the second storage cathode ray tube S2. Again, to provide a relatively slow or antenna bearing scansion across target 20a at right angles to the scanning produced by deflection coil 19a, deflection coil 21a is provided. Accordingly, the electron beam, when intensified, is scanned in raster or type B fashion across the storage face.

For exciting antenna bearing deflection coils 21 and 21a, synchro antenna bearing signals from the antenna scanner are supplied via lead 3 as seen in FIG. 1D to a conventional control transformer synchro 13 coupled by shaft 25 to servo motor 23. Any error signal output on lead 24 of synchro transformer 13 is, for instance, supplied to servo amplifier 22 to cause servo motor 23 to reposition transformer 13 so that it accurately follows the scanning radar antenna. Accordingly, shafts 25a, 25b, and 25c, also driven by servo motor 23, accurately and synchronously follow the antenna scanning position.

Shaft 25a of FIG. 1D drives a rotatable tap 26a of potentiometer 26, potentiometer 26 being placed across a source 27 of constant unidirectional voltage. Once each cycle of rotation of tap 26a, a cycle of a saw tooth wave is supplied by lead 28 through the respective adder circuits 29 and 29a and thence to azimuth deflection coils 21 and 21a of the respective storage tubes S1 and S2. Adders 29 and 29a are additionally respectively supplied with a relatively small oscillatory signal from bar oscillator 30 depending upon the action of bar control circuit 31, as will be explained. The bar oscillation voltage is added, for instance, to the azimuth sweep voltage within adder 29 and the composite signal is used in deflection coil 21 of FIG. 1C.

The operation of the first and second signal processing channels is seen to be controlled in part by a group of control circuits, several of which are associated directly with operation of storage tubes S1 and S2. These elements include the reset control 10 of FIG. 1A, the integrator control 91, the write control 33, and target control 53 of FIG. 1B, the erase control 34 and read control 35 of FIG. 1C, and the bar control 31 of FIG. 1D. Each such control circuit employs one or more switching devices, shown as relay devices as a matter of convenience, controlled by the apparatus 90 of FIGS. 1D and 5, as will be seen. It will be understood that the positions of the relay switch blades as shown in FIGS. 1A, 1B, 1C, and 1D correspond arbitrarily to the situation in which the apparatus 90 is causing information to be written into storage tube S1 and information is being read from storage tube S2. This moment is illustrated by the line A—A of FIG. 6, as will be explained.

Reset control 10 of FIG. 1A comprises a pair of relay switches having respective solenoids 36 and 37 with respective associated relay switch blades 36a and 37a. Blade 36a is urged by spring 36b to contact the inactive terminal 36d and is otherwise pulled into contact with the active terminal 36c by actuation of solenoid 36 when a voltage from the FIG. 5 apparatus 90 is applied to terminal 36e. Similarly, blade 37a is urged by spring 37b to contact inactive terminal 37d and is otherwise pulled into contact with the terminal 37c by actuation of solenoid 37 when a voltage from the FIG. 5 apparatus 90 is applied to terminal 37e. Momentary actuation of solenoid 36 or of solenoid 37 supplies a respective reset pulse to integrator 6 or to integrator 6a. It will be evident to those skilled in the art that semiconductor or other switches may be substituted, for example, for the relays of reset control 10. Similarly, such switches may be substituted in controls 31, 33, 34, 35, 53, and 91, yet to be discussed.

Integrator control 91 of FIG. 1B, as noted above, controls inputs to integrators 14 and 14a. Integrator control 91 comprises relay switch devices having switch blades 94 and 95. In the first channel of the system, switch blade 94 cooperates with spring 96 and solenoid 98. Solenoid 98 pulls blade 94 into contact with active terminal 94a when a signal is applied by the apparatus 90 of FIG. 5 to terminal 92. In the absence of such a signal, spring 96 pulls blade 94 to the inactive terminal 94b.

The second relay device within integrator control 91 operates similarly, but makes connections in an alternate sense in the second channel of the system, having a switch blade 95 cooperating with spring 97. Solenoid 99 pulls blade 95 into contact with inactive terminal 95b when a signal is applied by apparatus 90 of FIG. 5 to terminal 93. In the absence of such a signal, spring 97 pulls blade 95 to the active terminal 95a so that signals flow from integrator 6a into integrator 14a.

Write control 33 of FIG. 1B comprises a relay switch device having respective opposite solenoids 39 and 39a for controlling relay switch blade 41, blade 41 being capacitively coupled to lead 1 and connected to power supply 67. Switch blade 41 cooperates with active terminals 41a and 41c separated by an inactive terminal 41b. Springs 42, 42a tend to center the position of switch blade 41 on inactive terminal 41b, but actuation of solenoid 39 by a signal from the apparatus 90 of FIG. 5 on terminal 43 will cause switch blade 41 to move, as shown, to contact the terminal 41a. On the other hand, actuation of solenoid 39a by a signal from the apparatus 90 of FIG. 5 placed on terminal 44 will cause switch blade 41 to move to contact the terminal 41c. The switch blade 41, being connected by lead 1 to the radar system receiver, thus supplies target echo pulses and also supplies a voltage from power supply 67 either via lead 45 and terminal D to a write control electrode WR of storage tube S1 of FIG. 1C or via lead 45a and terminal G to a write control electrode WR of storage tube S2 of FIG. 1C. Operation of switch blade 41 thus provides radar video signals and also a write voltage from power supply 67 and permits the radar video to be written into storage device S1 or into device S2 when control signals appear at the respective terminals 43 or 44. Switch blade 41 rests on inactive terminal 41b when neither write control signal is present.

The write function, when performed by storage tube S1 or S2 of FIG. 1C, requires also that the positive voltage of the respective target electrode 20 or 20a be raised considerably above its normally nominal positive voltage level. For this purpose, target control 53 of FIG. 1B is supplied with a double-pole dual position switching system involving switch blades 38 and 38a driven by solenoids 46 and 46a jointly through mechanical linkage 32. In this arrangement, first and second power supplies 15a and 15b are connected alternately to the respective storage targets 20 and 20a. Target control 53 includes respective opposite solenoids 46 and 46a for controlling switch blades 38, 38a. Switch blade 38 cooperates with active terminals 40 and 40a, while switch blade 38a cooperates with active terminals 40a and 40b. Actuation of solenoid 46 by a signal from apparatus 90 of FIG. 5 applied on terminal 88 of FIG. 1B will cause switch blades 38, 38a to move to contact the respective terminals 40 and 40a as shown. On the other hand, actuation of solenoid 46a by a signal provided by the apparatus 90 of FIG. 5 placed on terminal 89 of FIG. 1B will cause switch blades 38, 38a to contact the respective terminals 40a and 40b. Switch blade 38, being connected either to terminal 40 or to terminal 40a, will alternately supply a voltage that is characteristic of power supply 15a or of power supply 15b over lead 58 in FIG. 1C to target 20. Switch blade 38a, being connected alternately to terminal 40a or to terminal 40b, will alternately supply the voltages characteristic of power supply 15b or power supply 15a via lead 58a in FIG. 1C to target 20a of storage tube S2.

Erase control 34 of FIG. 1C comprises a relay or switch device having respective opposite solenoids 47 and 48 for controlling switch blade 49. Switch blade 49 cooperates with active terminals 49a and 49c spaced apart from the central inactive terminal 49b. Springs 50, 50a tend to center the position of switch blade 49 on inactive terminal 49b, but actuation of solenoid 47 by a signal from the apparatus 90 of FIG. 5 when placed on terminal 51 of FIG. 1C causes switch blade 49 to move to contact the terminal 49a. On the other hand, actuation of the opposite solenoid 48 by a signal from the apparatus 90 of FIG. 5 placed on terminal 52 of FIG. 1C causes switch blade 49 to move to contact the terminal 49c. The switch blade 49, being coupled to the erase power supply 54, may supply a voltage via lead 55 or lead 55a and the respective terminals E or F to activate erase or flood electron beam control grids ER in storage tubes S1 and S2.

Read control 35 of FIG. 1C is a more complex relay device for switching read outputs from storage tubes S1 and S2, as well as read control inputs thereto. There are two states for the read control 35, so that it includes a relay switch blade 60 which contacts the terminal 60b when terminal 63 and solenoid 61 are excited by apparatus 90 in FIG. 5. Otherwise, blade 60 of FIG. 1C is automatically moved into contact with terminal 60a by virtue of the presence of spring 62. The relay switch blade 60, being connected to the read power supply 64, may thus supply a voltage via terminal 60a or 60b to activate the respective read control electrodes RE of storage tube S1 or storage tube S2.

Read control 35 has a second function performed in FIG. 1C by a two-position switch blade 66 connected by mechanical linkage 65 to blade 60 and therefore moved in synchronism therewith by solenoid 61 or spring 62. Blade 66 is moved to contact terminal 66a by the action of spring 62, and is pulled into contact with terminal 66b when solenoid 61 is actuated, as before. Switch blade 66 permits the reading out of charges which may be present on the storage surface of target 20 of storage tube S1 or on the target 20a of tube S2, the read out depending upon the position of switch blade 66. Whichever signal appears on blade 66 is capacity coupled to a single shot multivibrator 68 shown in FIG. 1D or other similar circuit for forming or re-creating a standardized target pulse for application via sum circuit 69, lead 70, and terminal A to the intensifier grid 71a of a conventional plan position or type P cathode ray radar display tube 71, all seen in FIG. 1D. It is to be observed that echo signals from the radar receiver are coupled via leads 1 and 72 and also through sum circuit 69 of FIG. 1D to intensifier grid 71a. The usual voltages are applied in a conventional way to other conventional electrodes of type P indicator 71 from power supplies of ordinary character (not shown).

Type P indicator 71 of FIG. 1D is otherwise operated in a conventional manner, having a rotatable electron beam magnetic deflection yoke or coil 74 rotated about the axis of tube 71 by the agency of gearing 75, 75a driven by shaft 25b and consequently by motor 23 so that yoke 74 moves in accurate synchronism with the radar antenna. Indicator deflection yoke 74 is supplied with a saw tooth range or radial sweep wave form via terminal B and brush system 76 from a conventional range sweep generator 77 after amplification, if needed, by amplifier 78. Range sweep generator 77 is under control of pulses supplied on leads 2 and 17a from the radar system synchronizer, as in conventional practice.

A means for supplying an identifying mark upon certain target images comprises bar or bearing marker oscillator 30 and bar control 31 of FIG. 1D operating in cooperation with adders 29 and 29a as previously mentioned. The bar oscillator circuit 30 may be a simple sinusoidal oscillator providing, for example, 500 kilocycles per second electrical oscillations. The bar oscillations are coupled to the relay switch blade 80 for application either via lead 83 or by lead 83a to a respective adder 29 or 29a, as previously indicated. Blade 80 is urged into contact with terminal 80b by spring 85. However, when a signal on terminal 82 from the apparatus 90 of FIG. 5 activates solenoid 81 of FIG. 1D, blade 80 moves to terminal 80a.

It will be understood by those skilled in the art that storage cathode ray tubes S1 and S2 have similar characteristics, but that there is a wide range of choice of such tubes having various electrode configurations for performing the write, read, and erase functions in substantially similar manners. Additional electrodes are sometimes present for aiding operation of the above mentioned essential electrodes; in some types of storage tubes, the electrode may be somewhat rearranged. For example, the charge pattern may be placed on one side of a target storage mosaic by a first electron beam and may be read from the other side of the mosaic by a second oppositely directed electron beam. It will also be appreciated that a wide variety of arrangements for supplying erase, read-out, and other potentials are known in the art and therefore do not require detailed consideration here. Furthermore, the invention may be successfully practiced using other types of storage media, such as digital storage arrays or video magnetic storage tape. Accordingly, the illustrated forms taken by storage tubes S1 and S2 of FIG. 1C are intended simply to be representative of a variety of forms which may successfully be used as storage devices.

As noted above, various types of cathode ray storage tubes may be employed as storage devices S1 and S2 of FIG. 1C, requiring different sets of voltage for the erase, write, and read functions. In a typical tube, mentioned here purely as an example, the first or signal grid (the grid coupled to terminal D or G) is placed at a voltage level about −30 volts for all functions. Where it may be desired to drop the first grid to −50 volts during the write function, switching to such a voltage is readily accomplished by those skilled in the art, using switching apparatus of the type generally shown in FIG. 1. The accelerator electrode of the storage tube may be held constantly at +300 volts. Where a focusing grid is furnished, it may be held at about +230 volts. The fourth or conventional mesh grid may be held, for example, at +450 volts. Target electrodes 20 and 20a are held, for example, at +250 volts during the writing phase, and nominally at a voltage of the order of +10 volts during read and erase functions.

Operation of the system will be understood from the foregoing with reference to FIG. 5 and especially to FIG. 6, which illustrates the relative time relations of the erase, write, and read functions for storage tubes S1 and S2 of FIG. 1C with reference to time indices 1 to 13 representing the start of the first scan of the antenna through 360°, the start of the second 360° antenna scan, and so on. The graphs to the right of each of the symbols S1 and S2 represent the timing of the functions (the vertical ordinates of the blocks making up the graphs have no significance other than to indicate that a particular function is being performed). From FIG. 6, it is observed that the functions are performed cyclically, the program repeating every eight antenna scansions. Choice of 20 or other number of scans for the cycle may prove in certain circumstances to be appropriate and the shorter cycle of eight scans is illustrated merely as a matter of convenience. Beginning arbitrarily at the start of the first antenna scan, it is seen that the target 20 of tube S1 of FIG. 1C is being read for four antenna scansions, integrator 6 having previously been reset (FIG. 1A). At the start of antenna scan five, the erase gun of tube S1 of FIG. 1C is activated for one antenna scan or a portion thereof. The target 20 is thus erased just before the start of the writing of signals from lead 45 onto the storage surface of target 20. Writing on target 20 begins at the sixth antenna scan and is normally completed at the time the seventh antenna scan is initiated. Immediately at the end of the write cycle, integrator 6 is reset. The reading of tube S1 starts at the beginning of the ninth antenna scan and the cycle repeats.

Storage tubes S1 and S2 of FIG. 1C are alternately read, so that the cycle of operation of tube S2 is shifted by half a cycle (four antenna scans) from that of tube S1. The requirement is that tubes S1 and S2 be read for equal non-overlapping intervals. Accordingly, while tube S1 is being read, the charge stored on target 20a of tube S2 is erased during one antenna scan. This is followed by writing information from lead 45a into tube S2, the resetting of integrator 6a, and then by two antenna scansions of inactivity. At the end of the tube S1 read out interval at the start of antenna scan number 5, tube S2 is read for four antenna scansions. Its erase, write, and read functions then continue cyclically as in the instance of storage tube S1.

As indicated in FIG. 6, unidirectional potentials for actuating the various control relays are supplied, as from the power supply 504 of FIG. 5, for causing the operation of the various functions of the system, including the erase, write, and read functions of storage tubes S1 and S2. For example, when tube S1 is read, such an actuating potential is applied to terminal 82 of bar control 31 of FIG. 1C and also to terminals 92 and 93 of integrator control 91. This and other such potential supplying events are listed for convenience in the following table:

| Function | Apply Potential to Terminal | Of Control |
| --- | --- | --- |
| Operate Integrator Control | 92 | Integrator Control 91 |
| Read S1 | 82 | Bar Control 31 |
|  | 92 and 93 | Integrator Control 91 |
| Erase S1 | 51 | Erase Control 34 |
| Write S1 | 43 | Write Control 33 |
|  | 88 | Target Control 53 |
| Reset Integrator 6 | 36e | Reset Control 10 |
| Operate Integrator Control 91 | 93 | Integrator Control 91 |
| Read S2 | 63 | Read Control 35 |
| Erase S2 | 52 | Erase Control 34 |
| Write S2 | 44 | Write Control 33 |
|  | 89 | Target Control 53 |
| Reset Integrator 6a | 37e | Reset Control 10 |

The table may readily be implemented by use of any of several conventional techniques, such as by use of the technique shown in FIG. 5. Shaft 25c, driven by the motor 23 of FIG. 1D and therefore in synchronism with the radar system antenna, drives a gear 501, whose perimeter is eight times greater than gear 500. Thus, shaft 502 on which gear 501 is mounted rotates once for every eight rotations of gear 500 and therefore of the radar antenna. Shaft 502 drives an assembly 503 of slip rings. The first ring 505 is fed by brush 505a from power supply 504 and is connected in a conventional way by wires (not shown) within assembly 503 to each of the conducting portions of the successive array of slip rings 506 to 513 of assembly 503. The same voltage is applied to each of rings 506 to 513 by making the realistic assumption that each control relay will actuate if excited by that voltage.

It is seen that the voltage of supply 504 is readily coupled for the desired actuation time interval by slip ring 506 and its associated brush 506a to terminal 82 of bar control 31 of FIG. 1D and to terminals 92 and 93 of integrator control 91 of FIG. 1B. Likewise, the voltage of source 504 is applied for the time intervals specified by FIG. 6 via slip ring 507 and brush 507a to terminal 51 of erase control 34 of FIG. 1C, via slip ring 508 and brush 508a to terminal 36e of reset control 10 of FIG. 1A, via slip ring 509 and brush 509a to terminal 43 of write control 33 and also to terminal 88 of target control 53 of FIG. 1B, via slip ring 510 and brush 510a to terminal 63 of read control 35 of FIG. 1C, via slip ring 511 and brush 511a to terminal 52 of erase control 34 of FIG. 1C, via slip ring 512 (not seen) and brush 512a to terminal 37e of reset control 10 of FIG. 1A, and via slip ring 513 (not seen) and brush 513a to terminal 44 of write control 33 and also to terminal 89 of target control 53, both of FIG. 1B. Thus, all functions of the system and of storage tubes S1 and S2 of FIG. 1C are controlled in terms of antenna scansions by the continued rotation of slip ring assembly 503 of FIG. 5 in synchronism with that antenna. It is deemed not necessary to show the hidden side of slip ring assembly 503, since only ordinary skill in the art is required to envision its structure in view of the actual teachings of FIGS. 5 and 6.

Figure 7:
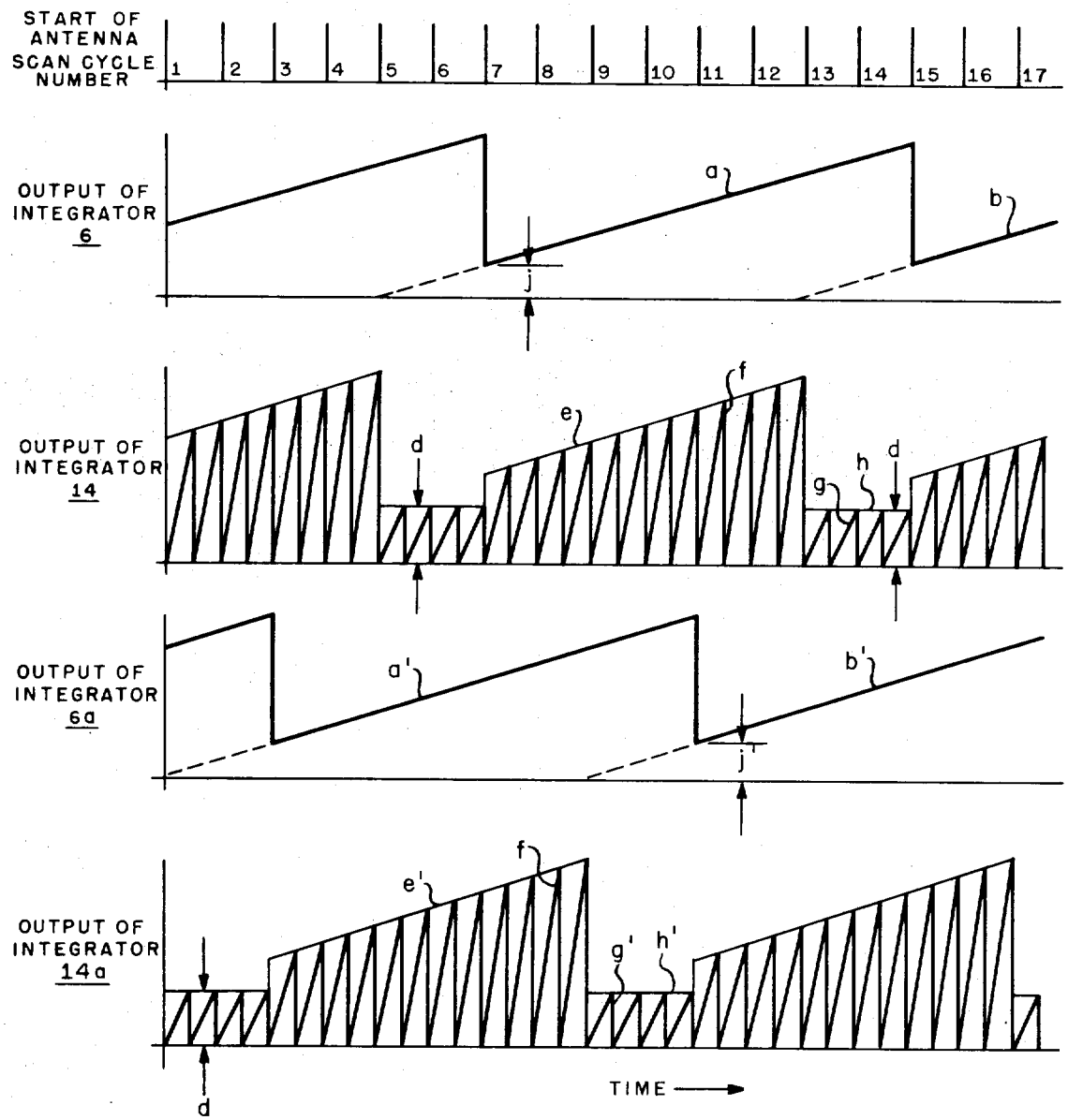
FIG. 7 is a graph used in explaining the operation of the apparatus of FIGS. 1A, 1B, 1C, and 1D.

Operation of integrator 6 of FIG. 1A immediately following the arrival of a reset pulse on lead 7 at the start of an antenna scan such as scan number 7, 15, and so on produces as an output a ramp wave such as at $a$ or $b$ in FIG. 7. Wave $a$ starts at a finite voltage value $j$ because of power supply 4. Since integrator 6 is reset every eight antenna scansions by succeeding reset pulses on lead 7, the continuing production of saw tooth wave portion $a$ results for the total period of eight antenna scans. Wave $a$ of FIG. 7 is coupled as one input to the integrator 14 of FIG. 1B, but only when switch blade 94 is in contact with terminal 94a. It will be seen that the latter part of the ramp $a$ is not available to integrator 14, switch blade 94 being then in contact with the inactive terminal 94b. After eight antenna scans, a new ramp $b$ is admitted to integrator 14 and the cycle continues to repeat.

At the input of integrator 14 of FIG. 1B, wave $a$ is off-set in part by a voltage indicated by $d$ in FIG. 7 derived on lead 16 from power supply 15. Voltage $d$ is always used in integrator 14. Integrator 14 is reset at the time of each radar synchronizer pulse applied to integrator 14 via leads 2 and 17. Thus, the output of integrator 14 for one six-scan period is a fast saw tooth wave $f$ having an increasing or ramp envelope $e$ actually defined by a portion of curve $a$ during the interval of the first six antenna scans. For the next succeeding two-scan period of the antenna (antenna scans 13 and 14), a wave $a$, as noted above, is not available to integrator 14. Only the constant voltage d is present at the input of integrator 14. Accordingly, the output of integrator 14 for the succeeding two-scan period of the antenna (scans 13 and 14), is a fast saw tooth wave $g$ having a constant height envelope $h$ actually defined by voltage $d$ from power supply 15.

Operation of integrator 6a of FIG. 1A immediately following the arrival of a reset pulse on lead 7a at the start of an antenna scan such as scan numbers 1, 9, 17, and so on produces an output ramp such as at a' in FIG. 7. Wave $a$ starts at a finite voltage value $j'$ because of the connection of power supply 4. Integrator 6a of FIG. 1A is reset every eight antenna scans by reset pulses appearing on lead 7a and, therefore, the continuing production of saw tooth wave portion $a'$ results for the period including eight antenna scans. Wave $a'$ of FIG. 7 is coupled as one input to integrator 14a, but only when switch 95 is in contact with terminal 95a. It will again be seen that the latter part of ramp $a'$ is not coupled to integrator 14a, since switch blade 95 is no longer in contact with active terminal 95a. After eight antenna scans, a new ramp $b'$ is admitted to integrator 14a and the cycle repeats.

At the input of integrator 14a of FIG. 1B, wave $a'$ is off-set in part by the voltage indicated by d in FIG. 7 derived on lead 16a from power supply 15. Voltage $d$ is always used in integrator 14a. Integrator 14a is reset at the time of each radar synchronizer pulse applied to integrator 14a via leads 2 and 17a. Thus, the output of integrator 14a for one six-scan period is a fast saw tooth wave $f$ having a ramp envelope $e'$ actually defined by a portion of curve $a'$ during the interval of the first six antenna scans. For the next succeeding two scans of the antenna (antenna scans 9 and 10), wave $a'$, as noted above, is not available to integrator 14. Only the constant voltage $d$ is present at the input of integrator 14a. Accordingly, the output of integrator 14a during antenna scans 9 and 10 is a fast saw tooth wave $g'$ having a constant height envelope $h'$ actually defined by voltage $d$ from power supply 15. It will be observed by inspection of waves $a$ and $a'$ in FIG. 7 that these waves are produced as if integration was actually begun respectively at the start of antenna scan 5 and at the start of antenna scan 9; i.e., at the ends of respective write cycle. In viewing FIG. 7, it will be understood that waves $f$, $g$, $f'$, and $g'$ have been drawn more open than they really are as a matter of convenience, there actually being many more cycles of these waves per cycle of waves a and $a'$ than illustrated in FIG. 7.

In operation, the invention provides a collision avoidance display on the type P cathode ray indicator 71 of FIG. 1D which is employed by the observer to evaluate the potential collision threat of one or more vessels in the vicinity of the ship being protected. It is seen that the basis of operation of the device lies in the superposition at any one time of two radar generated pictures on the screen of cathode ray tube 71. One picture is provided on indicator 71 directly from the radar receiver via leads 1, 72, and 70. The other is a superimposed picture derived by modifying radar data stored some time in the past either in storage tube S1 or S2 of FIG. 1C. The stored data is written alternately into tubes S1 and S2 while one of the respective constant sweep waves $g$ or $g'$ of FIG. 7 is employed by the active storage tube. The stored data is alternately read out of the respective storage tubes S1 and S2 while using a sweep wave, such as wave $f$ or $f'$, that has a finite increasing slope.

If the slope of wave $f$ or of wave $f'$ is made to vary arbitrarily as $(1-\lambda t)^{-1}$, where $\lambda$ is a constant, then a target ship originally at range $R_o$ will be read out of storage earlier or at a shorter range as time increases, thus making that target appear to be at range $R$ when displayed on the type P indicator 71 as superposed processed data. Consequently:

$$R = (1-\lambda t)R_o \quad (1)$$

By differentiation of equation (1):

$$(dR)/(dt) = \dot{R} = -\lambda R_o \quad (2)$$

Rearranging equation (2) yields:

$$R_o/\dot{R} = -(1/\lambda) \quad (3)$$

As is well known, the ratio $R_o/\dot{R}$ or $1/\lambda$ is the tau criterion widely recognized as a criterion for estimating collision potential. The tau criterion amounts to a decision threshold parameter whose dimension is time and which may actually correspond to the time of closest approach of two vessels.

As noted above, the presentation on indicator 71 of FIG. 1D consists of a normal type P display of raw radar data, plus a processed picture stored for a known interval of time. As has been seen, the stored data is given a special demarcation by bar control 31 and bar oscillator 30 of FIG. 1D when it is read out of storage and superimposed on the screen of display 71. According to the invention, the stored data is processed by the storage channels and tubes S1 and S2 of FIG. 1C in such a manner that all stored target ranges are foreshortened by an amount dependent upon their individual ranges, the time since they were stored, and a scale factor. The scale factor is manually preset according to a desired alarm time.

Assume that the system detects a target at range $R_o$ at time $t_o$. Call the time between the transmitted radar pulse and time of arrival of the echo $S_o$, then:

$$S_o = R_o/2c \quad (4)$$

where $c$ is the velocity of propagation of electromagnetic energy. In general:

$$S = R/2c \quad (5)$$

If the target has a radial velocity $\dot{R}$:

$$(dS)/(dt) = \dot{R}/(2c) \quad (6)$$

In the invention, radar data is stored by a storage tube, for example, as polar coordinate information, but is stored for convenience on a raster scanned storage electrode 20 or 20a (FIG. 1C). The range sweep, as has been shown, is in the form of a ramp $\rho = K_o s$, where $K_o$ is a constant having dimensions inches per second. At time $t_o$, the stored position $\rho_o$ is:

$$\rho_o = K_o(R_o/2c) \quad (7)$$

If the stored data is read out by a sweep wave such as wave $f$ of FIG. 7 whose gain K increases with time and, in particular, if $K$ is arbitrarily chosen so that:

$$K = K_o(1-\lambda t)^{-1} \quad (8)$$

then:

$$\rho = K_o s(1-\lambda t)^{-1} \quad (9)$$

Then, the time s after the start of a sweep is given by equation (9) when $t$ in equation (9) is the time interval between the storage of a given piece of radar data and its read out. Then:

$$s = (1-\lambda t)\rho_o K_o^{-1} \quad (10)$$

But, from equation (7):

$$\rho_o = K_o R_o/2c$$

therefore:

$$s = (1-\lambda t)R_o/2c \quad (11)$$

Substituting in equation (4) to get the apparent range of the processed target:

$$R_a = 2cs = (1-\lambda t)R_o \quad (12)$$

That is, the target that was originally stored at range $R_o$ now appears to have moved to a new range $R$ in the elapsed time $t$. Differentiating equation (12) yields:

$$\dot{R}_a = -\lambda R_o \quad (13)$$

or:

$$R_a/\dot{R}_a = -(1/\lambda) \quad (14)$$

It is thus seen that the analysis of the system yields the same result in equation (14) as was derived in equation (3), thus assuring that the rules implied by the basic tau criterion have been followed in generating the invention.

Figure 8:
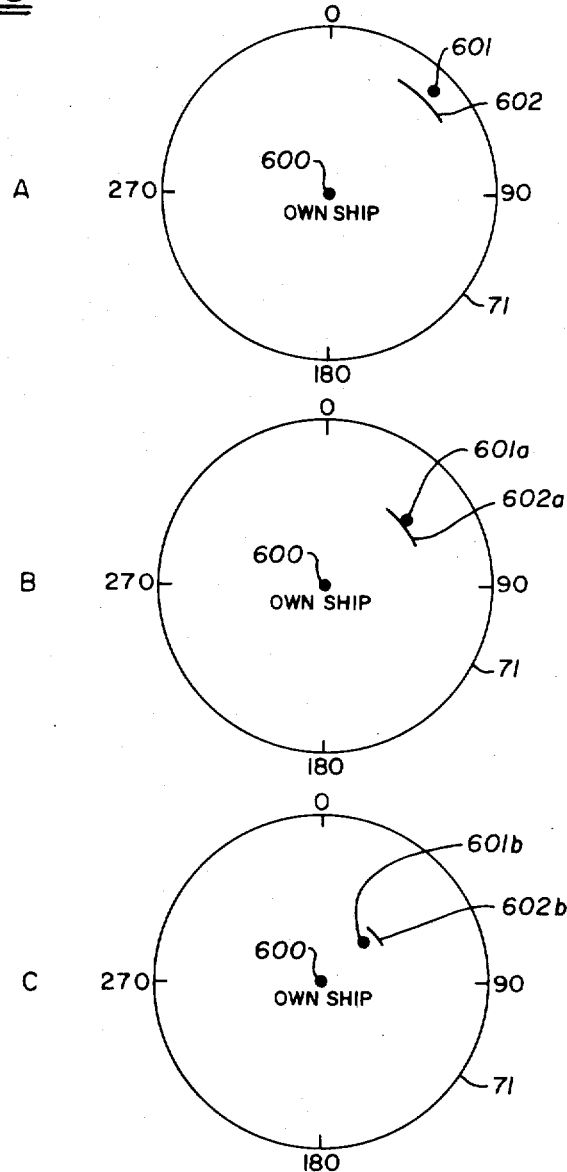
FIG. 8 is a drawing showing the display produced by the invention.

The presentation viewed by the observer on the screen of display 71 of FIG. 1D is seen in FIGS. 8A, 8B, and 8C. In these figures, own ship is indicated by the centrally located image 600. The display provides a rapid means for accurate assessment of the potential danger of collision with vessels, such as the vessel indicated by images 601, 601a, and 601b, in time to take corrective action. Each vessel, such as vessel 601, causes what may be termed a bar or a threat assessment marker, such as 602, to be generated in its proximity. The bar marker 602 may be beneficially selected to have a 5 degree arcuate extent by adjustment of the amplitude of output of bar oscillator 30 of FIG. 1D. The bar marker 602 moves toward own ship 600 on a radial course at a speed which, if it is allowed to complete its travel, will cause it to arrive at own ship 600 at a preselected time. Such a time is arbitrarily set by the observer by setting potentiometer taps 12 and 12a of FIG. 1A at the respective output of integrators 6 and 6a. Any radar return, such as return 601a of FIG. 8B, that falls on the bar or bearing marker 602a and then stays exactly in step with it, must arrive at own ship 600 from the range of first coincidence (FIG. 8B) in the time determined by the setting of taps 12, 12a of FIG. 1A, which adjustable taps may be referred to as the time control. All of the bearing or bar markers are automatically and periodically reset so that each new marker is identified with an image of a corresponding target that generated it.

In the examples of FIGS. 8A, 8B, and 8C, there are shown three possible but not necessarily, successive positions of a most highly threatening ship 601 on a constant bearing approach to own ship 600. The bearing is seen to be constant, since a line drawn between own ship 600 and the threatening ship 601 always bisects the bar of bearing marker 602. A ship departing from the most dangerous constant bearing approach will generate an image noticeably to one side or the other of the center of bar 602, but still may be dangerous because of an ensuing maneuver.

In FIG. 8A, the detected ship 601 is at a distance which, at its present relative speed, will take it longer than the arbitrarily selected time to reach own ship 600 (say, 15 minutes). In FIG. 8B, the detected ship 601a is moved forward toward own ship 600 and is substantially on bar 602a, indicating that it will take substantially 15 minutes to reach own ship 600. The detected ship 601a is considered to be a dangerous threat. In FIG. 8C, the detected ship 601b is clearly placed so that it will arrive at own ship 600 in less than the selected 15 minutes and is therefore considered extremely dangerous. Evasive action by own ship 600 must be achieved. While FIGS. 8A, 8B, and 8C represent certain types of dangerous situations, these and many other situations are recognized by observing the angular and range relations of the actual target image and the bar marker. Relative headings are readily ascertained as well as rates of bearing changes. The speed of the detected ship is readily estimated, and changes in speed are readily detected with reference to the moving bar marker. The marker may be made to move at one rate for targets in a first span of ranges and at another in a second span of ranges. For example, if it is desired to emphasize targets at relatively short or at relatively long ranges, the ramps a, e, a', and e' may have successive sections of two different slopes, rather than the constant slope illustrated in FIG. 7.

It will be seen by those skilled in the art that the above described processing system is able to supply either a relative or true motion display on type P indicator 71 of FIG. 1D. All elements determining which type of display is to be formed are present in conventional parts of the cooperating marine radar system not shown in the figures. Operation of the novel processing system does not disturb the original capability of the radar to produce either type of display.

The versatility of the novel radar data processing system is further illustrated by the fact that it is readily adaptable to operation with other types of electron beam scansion within the storage and display tubes. For example, FIG. 2 illustrates connections which may be made if type B or raster scansion is to be used for the indicator as well as for storage tubes S1 and S2. If the type P indicator of FIG. 1D is not to be used, it may simply be disconnected at terminals A and B and the type B indicator 100 of FIG. 2 substituted therefor. The intensifier grid 100a of cathode ray tube 100 is connected through terminal A in FIG. 1D to the output of sum circuit 69. Stationary deflection coils 101 and 102, each having one side grounded, are provided for cathode ray tube 100. The amplified saw tooth output of range sweep generator 77 of FIG. 1D is supplied to coil 102 by connecting it to terminal B in FIG. 1D. Finally, the relatively slow antenna bearing angle saw tooth sweep from potentiometer 26 of FIG. 1D is applied by coupling coil 101 to terminal C of FIG. 1D. By this means, a type B presentation is provided by indicator tube 100 that may be desired in special applications, such as for collision avoidance or rendezvous electronic array scanning antenna radar applications in very high speed marine craft or in aircraft.

FIGS. 3, 4, and 4a additionally indicate the diversity of ways in which the novel signal processor system may be employed. In these figures, parts which are similar to those in FIGS. 1C and 1D have been given similar reference numerals. For example, the type P display of FIG. 1D is again employed, with its cathode ray tube 71 and a rotatable deflection coil 74 driven through gearing 75, 75a by shaft 25b and motor 23 in synchronism with the motion of the radar antenna. Signals from the radar system receiver are, as in FIG. 1C, coupled via terminal H and sum circuit 69 in FIG. 1D to the intensifier grid 71a of indicator 71. Other parts of the apparatus of FIG. 3 are also similar in structure and in function to those of FIGS. 1C and 1D, such as bar oscillator 30, bar control 31, read power supply 64, read control 35, and single shot multivibrator 68 and are similarly connected.

Rotatable yokes or coils 200 and 200a are supplied to produce type P scansion of the read and write beams in the respective storage tubes S1 and S2. Looking particularly at the type P deflection system for storage tube S1, it comprises the rotatable coil 200 arranged in a mechanical mount 203 for rotation by gear 204 driven by shaft 25d and motor 23 in synchronism with the radar antenna. Its operation is strictly analogous to that of the type P deflection coil 74 used with indicator 71, since it is also provided via terminal B and lead 79 with the same range sweep signal as is applied via brush system 76 to coil 74. In FIG. 3, the necessary slip rings are not shown on mount 203 as a matter of convenience; they are seen in FIG. 4a. Similarly, the type P deflection system for storage tube S2 comprises rotary coil 200a arranged in mechanical mount 203a for rotation by gear 204a driven e shaft 25e and motor 23 in synchronism with the radar system antenna. Deflection coil 200a is provided via terminal B and lead 79 with the same range sweep signal as is applied to deflection coils 74 and 200.

As noted above, bar oscillator 30 and bar control 31 function as in FIG. 1D, but now supply oscillatory currents alternately to activate certain additional deflection coils within rotatable mounts 203 or 203a depending upon the state of the bistate bar control 31. Looking particularly at mount 203 associated with storage tube S1, it is seen that the bar deflection means comprises coils 201 and 202 having a common axis at right angles to the axis of tube S1 and consequently an axis at right angles to the axis of type P deflection coil 200. Coils 200, 201, and 202 are driven synchronously by servo motor 23. As a consequence, the common axis of coils 201 and 202 lies in the same plane as the actual radial deflection of the electron beam. In a similar manner, the bar deflection means for the storage tube S2 comprises coils 201a and 202a having a common axis at right angles to the axis of storage tube S2 and consequently at right angles to the axis of type P deflection coil 200a. Coils 200a, 201a and 202a are driven in synchronism by motor 23. As a consequence, the common axis of coils 201a and 202a always lies in the same plane as the actual radial deflection of the electron beam of storage tube S2.

The structure of the mechanical coil mounts 203 and 203a of FIG. 3 has been indicated only schematically therein and will be understood more completely by reference to FIGS. 4 and 4a. The storage tube S1, for example, is fixed in position along the axis of mount 203, which mount contains the type P deflection coil 200 and the two cooperating bar deflection coils 201 and 202. Mount 203 may be constructed in any of several ways known to those skilled in the art. For example, coils 200, 201, and 202 may be permanently fixed in the desired spatial relationship by potting them within a ring of insulating material according to standard processes. The mount 203 is fixed to gear 300 and is supported in suitable bearings (not shown) for rotation by gear 204, shaft 25d, and motor 23. It will be understood that mount 203 is driven so that its position is at all times synchronous with the radar system antenna position.

As in the case of the rotatable deflection coil 74 of type P indicator 71 of FIG. 1D, mount 203 is provided with a suitable slip ring-brush combination for introducing electron beam scanning potentials. For example, as seen in FIG. 4a, mount 203 may be supplied with three slip rings 400, 401, and 402 cooperating with a stationary assembly for supporting brushes 404, 405, 406. One brush, such as brush 404, may provide a common current return or grounded path. Brush 405 may be supplied with the bar control signal via lead 83 for application to coils 201 and 202. Brush 406 may be supplied with the output of range sweep generator 77 via lead 79 for application to type P deflection coil 200. It will be seen in FIG. 3 that the deflection arrangement for storage tube S2 is similarly constructed, being driven by motor 23 of FIG. 1D via shaft 25e and including a mount 203a having a type P deflection coil 200a and a pair of bar deflection coils 201a and 202a.

It is seen from the foregoing that the novel collision avoidance system provides the observer with a rapidly interpretable display of factors indicating collision possibilities between marine or other vehicles. Uncertainties and inaccuracies of prior art plotting methods are eliminated, in that the novel system warns of intruding vessels and assesses the potential of collision by employment of the tau criterion, rather than by using the former closest point of approach criterion. Errors due to prior art systems with dependence upon measurement of bearing are also eliminated. Current radar data is always available on the display, and, therefore, the normal capability of the associated radar is always present. The operator may evaluate target threat in an extremely simple manner, the display affording no opportunity for incorrect interpretation and requiring minimum training for accurate use. The observer is not required to make time-consuming plots or to make judgments based on difficult cues. The novel processing system is essentially non-saturable and can operate equally well over a large range of traffic densities. All potential collision and close-passing situations are presented. The first threat assessment of any marine target echo obtained from a conventional marine radar system occurs in less than sixty seconds after it first appears as raw radar data on the indicator screen. Information permitting re-assessment is displayed on a continuous basis thereafter. The technique is versatile, working well with different types of displays, such as with relative motion or true motion displays and with the origin of the display centered or off-centered. The further versatility of the novel collision avoidance system permits it to operate with various types of cues. Though the bar or bearing marker cue is preferred, other cues for demarking the processed data may readily be employed in special circumstances.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Collision avoidance apparatus comprising:
radar means for detecting echoes corresponding to a first object location coordinate value at a first instant of time and to a second object location coordinate value at a second instant of time of a movable object in the vicinity of said collision avoidance apparatus,
storage means for storing at said first instant of time a representation of said first coordinate value,
read out control means for reading said storage means at said second instant of time and for modifying said first coordinate value by a predetermined factor, and
means for the simultaneous display at said second instant of time of first and second images of said object respectively in terms of said second coordinate value and of said modified first coordinate value.

2. Apparatus as described in claim 1 wherein:
said radar receiver means comprises means for detecting echoes corresponding to range and bearing coordinate values of said movable object each at respective first and second instants of time, and said storage means comprises means for storing at said first instant of time of a representation of said range and bearing coordinate values at said first instant of time.

3. Apparatus as described in claim 2 wherein said read out control means comprises means for modifying and reading out said value of said stored range value and for reading out said stored bearing value.

4. Apparatus as described in Claim 3 wherein said means for simultaneous display comprises means for displaying said first and second images respectively in terms of said bearing value and of said modified range value at said first instant of time and in terms of said bearing and range values at said second instant of time.

5. Apparatus as described in claim 1 comprising means for modulation alteration of said image representing said modified first coordinate value.

6. Apparatus as described in claim 4 comprising means for modulating said bearing value of said first instant of time for the purpose of causing said first image to have a distinctive demarcation with respect to said second image.

7. Apparatus as described in claim 6 wherein said distinctive demarcation takes the form of an arc of a circle.

8. In a radar system having a cathode ray beam indicator means wherein an object echo signal is represented by forming an image on the screen of said indicator means in terms of the range and bearing coordinates of said object and wherein said radar system includes radar system range synchronizer means providing synchronizing signals for synchronizing the start of the range sweep for sweeping said cathode ray beam relative to said indicator screen in range and antenna bearing pick off means for synchronizing the start of sweeping of said cathode ray beam relative to said indicator screen in bearing, means for intensifying said cathode ray beam comprising:
    storage means comprising:
        electron beam projection means,
        target means having electron storage capability, and
        electrode means for intensifying an electron beam from said electron beam projection means,
    means under control of said antenna bearing pick off means for applying said echo to said electrode means for intensifying said electron beam of said storage means during a first scan of said antenna,
    first deflection control means for supplying a substantially constant amplitude range sweep field in a region between said projection means and said target means for positioning said intensified electron beam according to object range during said first scan of said antenna relative to said target means,
    second deflection control means cooperating with said antenna bearing pick off means for supplying a substantially constant amplitude saw tooth bearing sweep field in said region,
    means under control of said antenna bearing pick off means for read out of said target means during scans of said antenna subsequent to said first scan,
    means cooperating with said first deflection means for supplying during said subsequent scans, cycles of an increasing amplitude saw tooth range sweep field in said region, and
    means for conveying an output of said read out means for intensifying said cathode ray beam of said cathode ray indicator.

9. Apparatus as in claim 8 wherein said first deflection means comprises:
    integrator means having first and second input means and output means,
        said first input means being supplied with a substantially constant electrical signal, said second input means being supplied with integrator reset pulses under control of said radar synchronizer means, and
        said output means being supplied for forming said range sweep field of said storage means.

10. Apparatus as described in claim 8 wherein said means for supplying said increasing amplitude saw tooth range sweep field comprises:
    first integrator means having first and second input means and output means,
        said first input means being supplied with a substantially constant electrical signal, and said second input means being supplied with integrator reset pulses under control of said antenna bearing pick off means,
    second integrator means having first input means coupled to said first integrator output means, second and third input means, and output means,
        said second input means being supplied with a substantially constant electrical signal,
        said third input means being supplied with integrator reset pulses under control of said radar synchronizer means, and
        said output means being supplied for forming said increasing amplitude range sweep field of said storage means.

11. Apparatus as described in claim 8 comprising:
    first and second storage means comprising:
        first and second respective electron beam projection means,
        first and second respective target means having electron storage capability, and
        first and second respective electrode means for intensifying first or second respective electron beams from said respective first and second electron beam projection means,
    means under control of said antenna bearing pick off means for applying said echo to said first electrode means for intensifying said electron beam of said first storage means during a first time interval and for applying said echo to said second electrode means for intensifying said electron beam of said second storage means during a second time interval,
    first deflection control means for supplying a substantially constant amplitude range sweep field in a first region between said first projection means and said first target means for positioning said first intensified electron beam according to object range during said first time interval relative to said first target means and for supplying a substantially constant amplitude range sweep field in a second region between said second projection means and said second target means for positioning said second intensified electron beam according to object range during said second time interval relative to said second target means, second deflection control means cooperating with said antenna bearing pick off means for supplying a substantially constant amplitude saw tooth bearing sweep field in said first and second regions, means under control of said antenna bearing pick off means for read out of said second target means during said first time interval and for read out of said first target means during said second time interval, means, cooperating with said first deflection means for the supplying, during said second period of time, of cycles of an increasing saw tooth range sweep field to said first region and for supplying, during said first period of time, of cycles of an increasing saw tooth range sweep field to said second region.

means, under control of said antenna bearing pick-off means, for alternately conveying outputs of said first and said second read out means for intensifying said cathode ray beam of said cathode ray indicator.

12. Apparatus as described in claim 11 comprising means under control of said antenna bearing pick off means for modulating said antenna bearing pick off field applied to said first storage means during read out of said first storage means and for similarly modulating said antenna bearing pick off field applied to said second storage means during read out of said second storage means for demarcation purposes.

13. Collision avoidance apparatus comprising:

radar means for detecting an echo corresponding to the range $R_o$ at a first instant of time and at the range at a second instant of time of a movable object in the vicinity of said collision avoidance apparatus, storage means for storing a representation of said range $R_o$ at said first instant of time, read out control means for reading out and modifying said stored representation of range $R_o$ by a factor $(1-\lambda t)$ for the generation at said second instant of time of a representation of apparent range $R_a$ substantially defined by the equation:

$$R_a = (1-\lambda t)R_o$$

where t is the elapsed time between said first and second instants of time and $\lambda$ is a manually selectable constant, and means for display of first and second images of said object,
said first image representing said object at said range at said second instant of time, and
said second image representing said object at said apparent range $R_a$.

14. Apparatus as described in claim 13 comprising means for modulation alteration of the form of said second image representing said object at said apparent range $R_a$ so that it is readily distinguished from said first image representing said object at said range at said second instant of time.

15. Apparatus as described in claim 14 wherein said means for altering the form of said second image representing said object at said apparent range $R_a$ comprises means for generation on said means for display of an arc of a circle bisected by the unmodulated portion of said second image.

* * * * *